United States Patent [19]

Rishovd et al.

[11] 3,963,352

[45] June 15, 1976

[54] WHEEL ALIGNMENT APPARATUS

[75] Inventors: Sigurd A. Rishovd, Golden Valley; Richard P. Vizenor, Columbia Heights, both of Minn.

[73] Assignee: Royal Industries, Inc., Pasadena, Calif.

[22] Filed: Oct. 24, 1973

[21] Appl. No.: 409,134

Related U.S. Application Data

[63] Continuation of Ser. No. 212,773, Dec. 27, 1971, abandoned, Continuation of Ser. No. 706,270, Feb. 19, 1968, abandoned.

[52] U.S. Cl. ............................... 356/152; 356/155; 33/288; 33/336; 33/337
[51] Int. Cl.$^2$ .................. G01B 11/26; G01B 19/80
[58] Field of Search .............. 356/152, 155; 33/288, 33/336, 337

[56] References Cited
UNITED STATES PATENTS

| | | | |
|---|---|---|---|
| 2,700,319 | 1/1955 | Carr | 356/155 |
| 3,409,991 | 11/1968 | Davis et al. | 33/336 |
| 3,470,377 | 9/1969 | Le Febre et al. | 356/152 |
| 3,486,826 | 12/1969 | Colvin et al. | 356/152 |

FOREIGN PATENTS OR APPLICATIONS

| | | | |
|---|---|---|---|
| 182,171 | 1/1963 | Sweden | 356/155 |

*Primary Examiner*—Maynard R. Wilbur
*Assistant Examiner*—S. C. Buczinski
*Attorney, Agent, or Firm*—Warren A. Sturm

[57] ABSTRACT

Wheel alignment apparatus for electrically indicating the alignment condition of a vehicle wheel in which there is sensing means, including an element adapted to be detachably secured to the wheel, for producing an electrical output dependent upon the extent of inclination of the wheel and an electrical display device having a movable member positioned in accordance with the electrical output of the sensing means. The sensing means is designed to selectively detect toe-in, camber, and caster.

24 Claims, 7 Drawing Figures

FIG 7

WHEEL ALIGNMENT APPARATUS

This is a further continuation of application Ser. No. 212,773, filed Dec. 27, 1971, now abandoned, a continuation of Ser. No. 706,270, filed Feb. 19, 1968, now abandoned.

BACKGROUND OF THE INVENTION

Various arrangements have been proposed in the prior art for measuring the various characteristics of alignment, such as toe-in, camber and caster. In some cases, such apparatus has relied upon interpreting an indication derived adjacent the vehicle wheel. This has the disadvantage that the information must be read in an area which may be poorly illuminated and which information is available only to the mechanic making the test. While arrangements have been devised for optically transmitting the information to a chart, the relationship of this chart to the wheel being tested is sometimes critical and depends for its operation upon the transmission of a light beam over a relatively large distance. In other cases, the alignment apparatus has required an excessive number of mechanical parts, the relative interconnections of which affect the accuracy of the reading and the interpretation of which is often dependent upon the skill of the mechanic.

SUMMARY OF THE INVENTION

An object of the present invention is to provide an arrangement in which the alignment characteristic being measured is readily observable even at a substantial distance from the vehicle so that the display may be observable to not only the mechanic but also to others present such as the owner. This is broadly accomplished by electrically transmitting the results of the sensing unit to an electrical device having a movable member movable in accordance with the extent of energization of the device. As part of the sensing means, we employ a unit which is detachably secured to the vehicle wheel, such as by a magnet. This unit secured to the wheel in a specific form includes both a device for indicating the toe-in inclination and also a device for indicating the camber inclination.

In order to measure toe-in, we employ a source of light, a reflector, and a light sensing means which produces a variable signal depending upon the toe-in inclination of the wheel. In our specific embodiment, the reflector is carried by the unit detachably secured to the wheel and the source of light and light sensing means are located in a housing spaced from the wheel-carried unit. The means for sensing the camber inclination, which is also used to measure caster, takes the specific form of a gravity sensitive variable impedance. Provision is made in connection with both the toe-in measuring and the camber measuring portions of the wheel unit to provide for adjusting the angle of the portion of the wheel-supported unit carrying the sensing device with respect to the mounting means to compensate for the normal inclination when the alignment characteristic being measured has the desired value.

The remote indication of the alignment condition being measured is provided in connection with a display box containing an electrical meter, the position of the movable member of which is projected onto a display screen. The indicia on the display screen can be changed to indicate whether toe-in or camber-caster is being measured.

In one form of our apparatus, we also provide means for guarding against changes in the ambient light affecting the reading obtained by the sensing means. Specifically, this is done by means of a rotating disc which periodically interrupts the light beam being used for measuring the alignment condition with an amplifier which is responsive only to the pulsating condition resulting from rotation of the chopper disc.

Various objects of the invention and details of the preferred embodiments will be apparent from the accompanying drawing and subsequent description of the same.

BRIEF DESCRIPTION OF THE DRAWING

FIG. 1 is a schematic representation of our apparatus being employed for measuring toe-in;

FIG. 2 is a schematic view showing the physical disposition of various elements of our apparatus with respect to the vehicle's wheels during the testing of toe-in;

DESCRIPTION OF THE PREFERRED EMBODIMENTS

Figure 1:
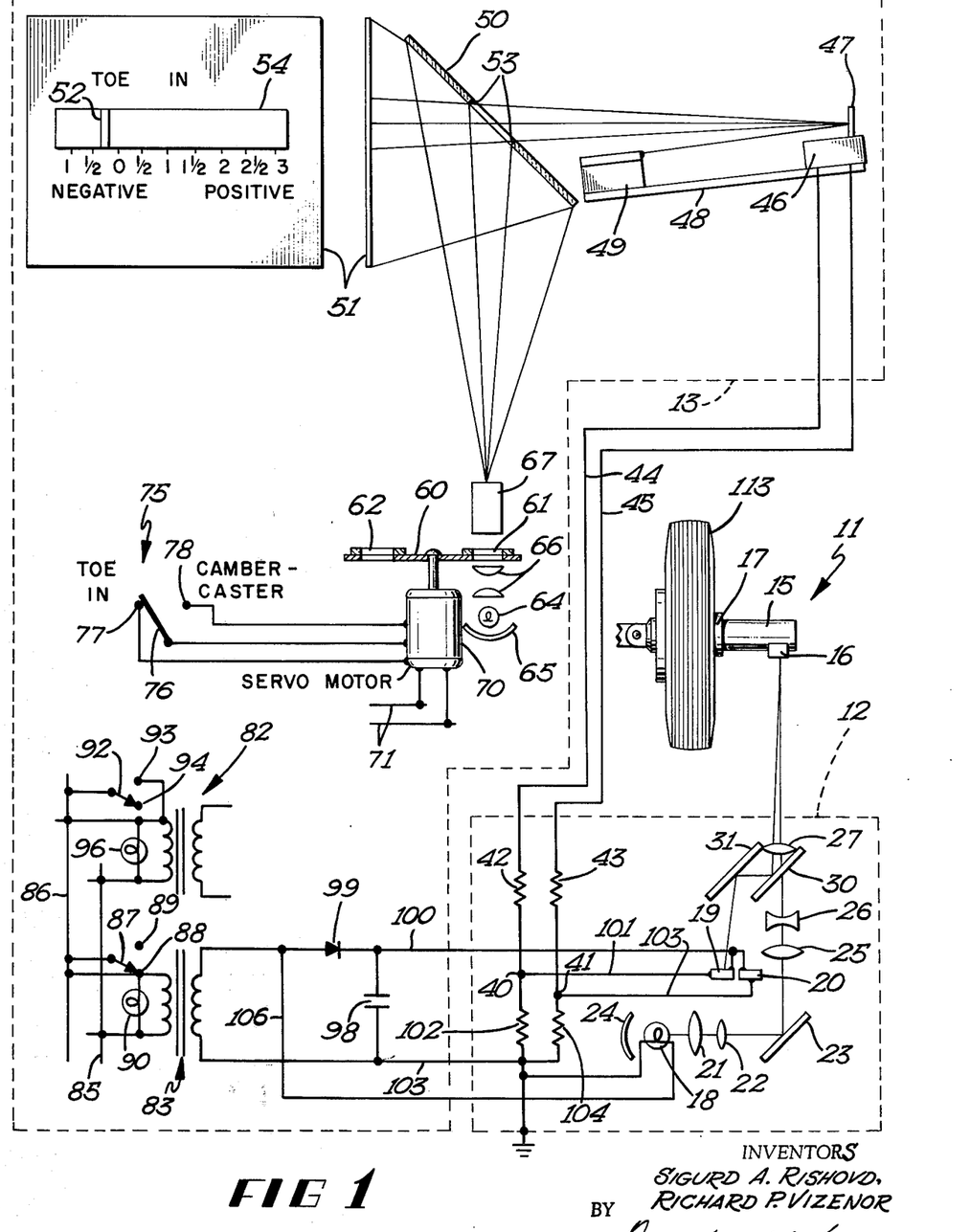

Referring first to FIG. 1, the apparatus will be described with reference to its function in measuring toe-in. The apparatus generally consists of three units generally indicated by the reference numerals 11, 12 and 13. The units 11 and 12 collectively constitute the sensing means and the unit 13, the display means.

The unit 11, which is shown in more detail in FIGS. 3 and 4 and will be described in connection with those figures, generally comprises a cylindrical casing 15 in which is disposed a mirror 16. The casing 15 is adjustably secured to a magnet 17 which is of sufficient size and magnetic attraction to be able to hold the entire unit 11 against the end of the axle housing of a wheel.

Located within the housing of unit 12 which constitutes the other part of the sensing means is a source of light, such as an electrical bulb 18, and a pair of light sensitive devices 19 and 20. These, for example, may be cadmium-sulfite photosensitive cells which conduct current in accordance with the amount of light they receive. The light source provided by the lamp 18 is concentrated by a spherical reflector 24 and directed through lenses 21 and 22 onto a mirror 23 which, in turn, directs the light through lenses 25, 26 and 27 out through an opening in the housing of unit 12 to the mirror 16. The light reflected by mirror 16, which is of a special construction to be described, is reflected back through lens 27 onto the reflecting surfaces of a beam splitter 30. Beam splitter 30 is provided on its upper edge with a reflective coating which allows light introduced into the rear of the splitter 30 to pass through the reflective coating but operates to reflect any light directed against the reflective surface. A light reflected back from mirror 16 when it engages the reflective coating of beam splitter 30 is accordingly reflected onto a mirror 31 so as to, in turn, be reflected into the path of the light sensitive cells 19 and 20. As will be explained in more detail, when the toe-in being measured is proper, the portion of the light beam reflected from reflective surface 31 will extend between cells 19 and 20 so that these cells are either not illuminated at all or equally illuminated. The two light sensitive cells 19 and 20 are energized by a source of voltage located in the display housing 13 and are connected in opposition to each other across two terminals 40 and 41 which, in turn, are connected through resistors 42 and 43 and conductors 44 and 45 to a meter 46 located within the display housing 13. The meter 46 has a movable arm provided with a mirror 47. The meter 46 is mounted on a base support 48 which also carries a highly concentrated source of light 49. The light from light source 49 is directed onto mirror 47 and, in turn, is directed through an uncoated portion 53 of a mirror 50. The uncoated portion is rectangular and the light passing through this rectangular uncoated portion appears as an illuminated line on a display screen 51. The front of the display screen is shown to the lift in FIG. 1 and the illuminated line just referred to is identified in that portion of the figure by the reference numeral 52.

The display screen 51 which is located on the front of the display unit 13 consists of a translucent panel on which various indicia may be projected so as to be visible from the front thereof. As shown in FIG. 1, the legend "Toe-In" appears above the central portion 54. Below the central portion 54, the numerals 1, ½, 0, ½, 1, 1½, 2, 2½ and 3 are visible, these being indications of the degree of toe-in. Beneath these numerals appear the legends "Negative" and "Positive", these legends indicating that the degrees of toe-in to the left of the legend 0 are degrees of negative toe-in while those to the right of the 0 symbol are degrees of positive toe-in.

Since, as will be described in connection with FIG. 5, it is desirable to use the same unit for measuring camber and caster, it is necessary to change the indicia appearing upon the screen 51. This is accomplished by providing the desired indicia on a series of transparencies which can be selectively brought into projecting position. These transparencies are mounted within a rotatably adjustable disc 60 and are indicated in the example shown by the reference numerals 61 and 62. A lamp 64, cooperating with a reflector 65 and lenses 66 operates to direct a beam of light through the transparency being viewed, in this case, transparency 61. The image is, in turn, projected through a further lens system 67 onto the reflector 50 and hence onto the translucent screen 51. It will be obvious that the indicia upon the transparency 61 will, in turn, appear upon the screen 51, the indicia of transparency 61 being that required for measuring toe-in.

The rotatable disc 60 carrying the transparencies 61 and 62 is positioned by a servomotor 70 which is connected to a suitable source of power represented by the leads 71. The operation of servomotor 70 is, in turn, controlled by a two-position switch 75 having a switch blade 76 movable into engagement with either of two fixed contacts 77 and 78. The switch blade 76 and contacts 77 and 78 are connected to the servomotor 70. When switch blade 76 is in the position shown, that is, when it is in engagement with contact 77, the servomotor runs until it assumes the position shown in which transparency 61 is in projecting position. When, however, the switch blade 76 is moved into engagement with the other fixed contact 78, the servomotor is energized to rotate the disc 180° to bring transparency 62 into projecting position. Contact 77 of switch 75 constitutes the toe-in contact while contact 78 constitutes the camber-caster contact. Servomotors of the type of servomotor 70 are old and very well known and need not be described in detail.

As previously mentioned, the light sensitive cells 19 and 20 are energized from a source of voltage located in the display unit 13. It will be noted that there are two transformers 82 and 83, these preferably being step-down transformers. Transformer 82, as will be referred to later, is employed for energizing the camber-caster system. Transformer 83 is used for energizing the toe-in portion of the system. The lower terminal of the primary winding of transformer 83 is connected to a lead wire 85, one of two lead wires 85 and 86 leading to any suitable commercial source of power such as a 115-volt A.C. source. The upper terminal of the primary winding of transformer 83 is connected to a switch terminal 88 which cooperates with a switch blade 87 which is movable between engagement with terminal 88 and a "dead" terminal 89. The switch blade 87, is, in turn, connected to the other power supply lead 86. Connected across the primary winding of transformer 83 is a signal lamp 90 which is energized when power is being supplied to the primary winding of transformer 83 to indicate that the toe-in apparatus is energized. As will be referred to in more detail in connection with FIGS. 5 and 6, the switch blade 87 is operatively connected to a switch blade 92 cooperating with fixed contacts 93 and 94, contact 94 being connected to the primary winding of transformer 82 and contact 94 being a "dead" contact. Switch blade 92 is connected to the same line conductor 86 as is switch blade 87. Similarly, a light 96 is connected across the primary of winding 82 to indicate when the same is energized. The switch blades 87 and 92, being operatively connected together as will be shown in FIG. 6, operate to cause energiztion of either the primary winding 83 or the primary winding of transformer 82 depending upon the positions in which the switch blades are placed. As shown, the switch blades are in such a position that the switch blade 87 is in engagement with contact 88 to cause power to be applied to the primary of transformer 83.

The secondary of transformer 83 is connected across a filter capacitor 98 through a rectifier 99. There thus appears across the terminals of filter capacitor 98 a D.C. voltage, the upper terminal of capacitor 98 being positive and the lower terminal negative. The upper positive terminal of capacitor 98 is connected through a conductor 100 to the junction of light-sensitive cells 19 and 20. The opposite terminal of light sensitive cell 19 is connected through a conductor 101 and a resistor 102 to a conductor 103 leading to the lower negative terminal of capacitor 98. The opposite terminal of light sensitive cell 20 is connected through a conductor 103 and a resistor 104 to conductor 103. Resistors 102 and 104 have the same resistance value and when equally illuminated the light sensitive cells 19 and 20 similarly have an equal resistance value. Under these conditions, it will be evident that terminals 40 and 41 which are located at the junctions of conductors 101 and 103 to resistors 102 and 104, respectively, are of the same potential. When, for example, the light sensitive cell 19 is more intensely illuminated as indicated in the drawing, the conductivity of this cell becomes much greater than that of cell 20 so as to decrease the voltage drop therethrough and increase the voltage drop through resistor 102. This results in the potential of terminal 40 being higher than that of terminal 41. When, conversely, light sensitive cell 20 is the one which is more intensely illuminated, the potential of terminal 41 will be more positive than that of potential 40. It will thus be readily apparent that a voltage exists between terminals 40 and 41 which is dependent, both in magnitude and polarity, upon the relative intensity of illumination of light sensitive cells 19 and 20. This potential existing between terminals 40 and 41 is applied, as previously described, through resistors 42 and 43 and conductors 44 and 45 to the meter 46 in the display unit 13. Thence, as previously explained, the relative illumination of cells 19 and 20, dependent upon the degree of toe-in, controls the voltage existing across terminals 40 and 41 and which is applied to meter 46 to, in turn, indicate on screen 52 the amount of toe-in.

The power supply which has been described in connection with the power supply for light sensitive cells 19 and 20 also provides illumination for the lamp 18. It will be noted that a conductor 106 leads from the upper terminal of the secondary of transformer 83 to one terminal of lamp 18. The opposite terminal of lamp 18 is, in turn, connected to conductor 103 which leads to the lower terminal of the secondary of transformer 83. Thus, an A.C. voltage is applied across lamp 18 which is of a magnitude corresponding to the secondary voltage of transformer 83.

Figure 2:
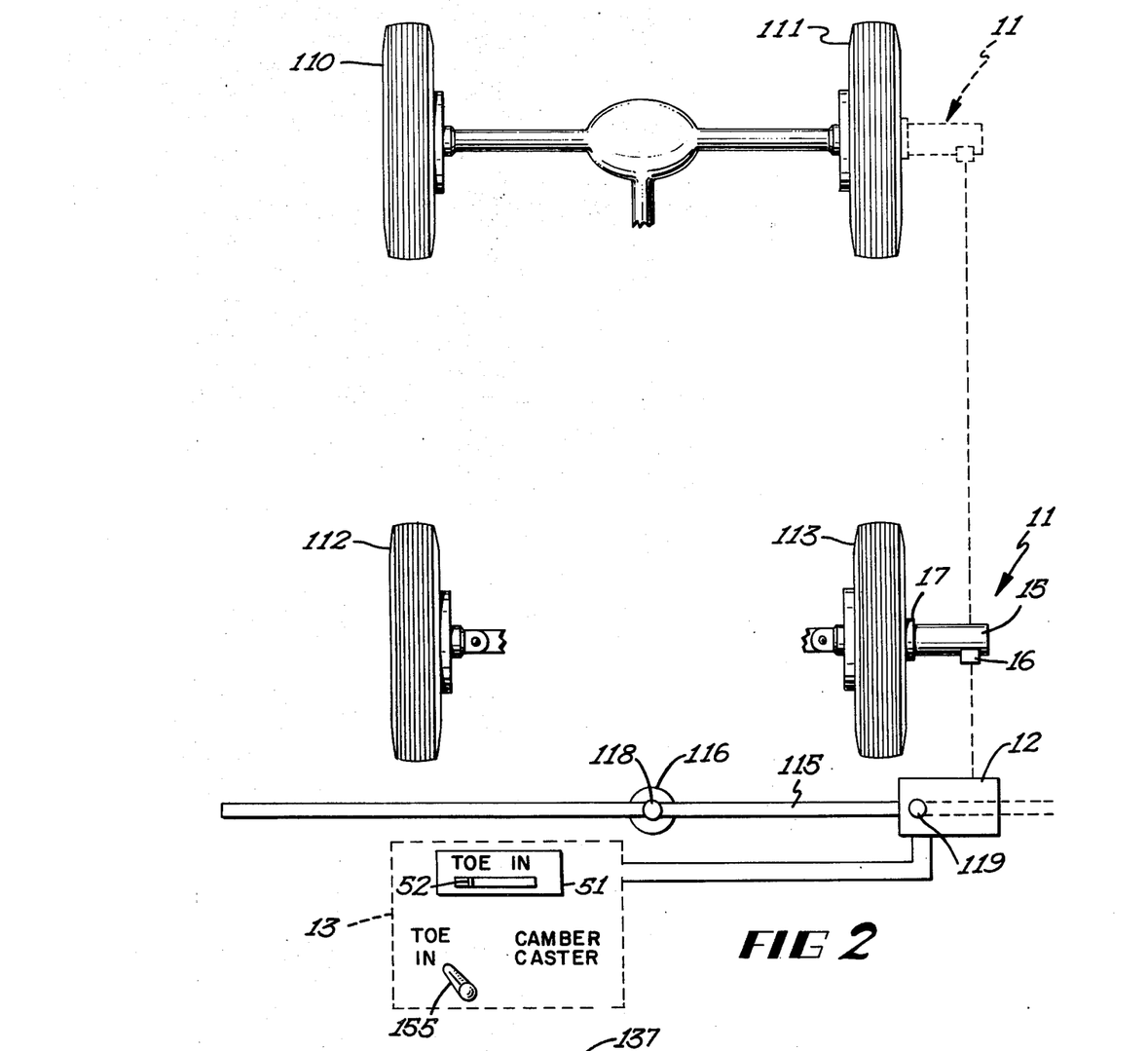

In FIG. 2, we have shown our apparatus, as it is physically arranged in connection with the wheels of an automobile for testing toe-in. The numerals 110 and 111 indicate the conventional rear wheels of an automobile while the numerals 112 and 113 indicate the conventional front wheels of an automobile.

Disposed in front of the vehicle is a support for the light sensitive unit 12, this support comprising a bar 115 which is pivotally supported upon a pedestal 116. The bar 115 may be adjusted around the pedestal 116 and locked in any desired angular position with respect thereto. The unit 12 is adjustable longitudinally along the bar 115 and, in turn, can be locked in any adjusted longitudinal position with respect thereto.

In adjusting for toe-in, it is desirable that the support bar 115 be parallel to the rear axle of the automobile and that the light sensitive unit 12 be in a proper longitudinal position with respect to the mirror of the wheel attached unit 11. To accomplish this, the unit 11 is magnetically attached to one of the rear wheels such as wheel 111. The bar 115 is adjusted about the pivotal support 116 and the longitudinal position of unit 12 on bar 115 is adjusted so that a zero reading is obtained on the display unit 13. The bar 115 is now locked in position with respect to the pivotal support 116 by suitable clamping means indicated by the reference numeral 118. The light sensitive unit 12 is also locked in position on the bar 115 by a suitable clamping means 119. The unit 11 is now moved to the front wheel. If the automobile being tested is of the type in which the rear wheels and the front wheels are equally spaced, no further adjustment of unit 12 is necessary. If, however, the automobile is of the type in which there is a slightly different spacing between the front wheels and the rear wheels, it is now necessary to move the unit 12 by a corresponding amount on bar 115. The unit is again locked by locking means 119 in this position on the bar.

By placing unit 11 first on the rear wheels, and adjusting the angular position of bar 115 and the longitudinal position of light sensitive unit 12 one bar 115, it is assured that the bar 115 will be in a position parallel to the rear axis of the automobile while the test is being made on the front wheels. With the unit 11 on the front wheel, the main body portion 15 is adjustably rotated with respect to the magnet support 17. As will be described in more detail in connection with FIGS. 3 and 4, opposing faces of the body portion 15 and of the magnet 17 which is secured to the wheel are slightly inclined with respect to each other so that as the body portion 15 is rotated, the angular position of the main body portion 15 with respect to the axis of the wheel bearing is changed. Suitable calibrations are provided so as to permit this angular position to be changed to correspond to the desired amount of toe-in. From the foregoing description, it will be apparent that if the wheel has this desired amount of toe-in, tthe light beam reflected back from the mirror 16 will equally impinge the two light sensitive cells 19 and 20 causing the position of the light beam 52 to be at the zero reading. If the toe-in is improper, the light beam 52 will be to one side or the other of the zero point and the mechanic will be informed that the necessary adjustment of the toe-in must be made. The toe-in is then adjusted until the light beam reads zero.

It will be noted that the toe-in indication is transmitted to a point where it is readily observable to the mechanic, regardless of the illumination of the area in which the mechanic is working. Furthermore, it is possible to place the display unit 13 so that the owner of the automobile may, if he is present, observe the reading, thus being assured that the alignment is being properly corrected.

Figure 3:
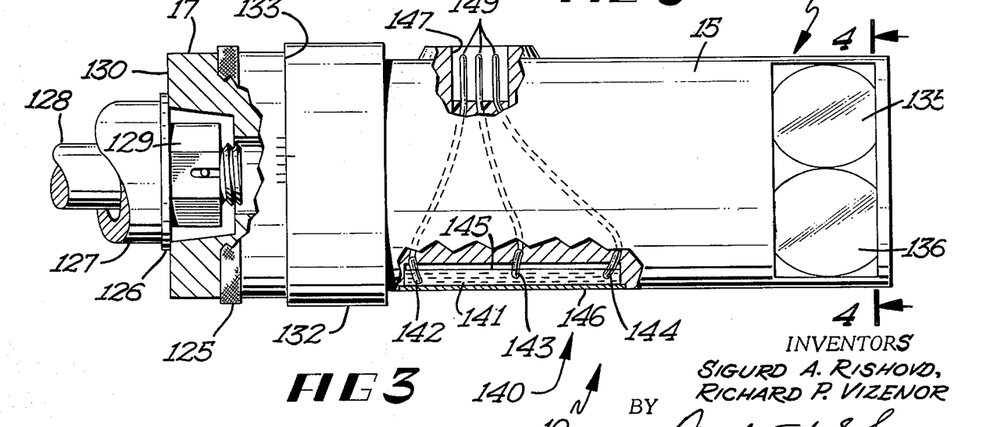
FIG. 3 is a view partly in section of the unit which is attached to the vehicle wheel, the figure showing the same as being so attached.
Figure 4:
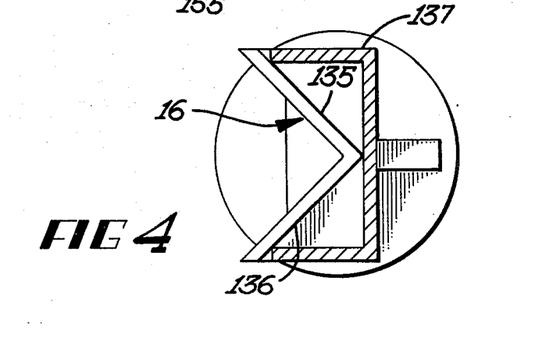
FIG. 4 is a sectional view of the unit of FIG. 3, the section being taken along the line 4—4 of FIG. 3.

Referring now to FIGS. 3 and 4, the unit 10 is shown in more detail. It will be noted that the magnet unit 17 comprises a projecting annular portion 125 which is suitably narrow so that it can be gripped. The magnet portion 17 engages against a washer 126 engaging the end wall of the axle housing 127. It is to be understood that the axle housing 127 supports the axle 128 through the usual front wheel bearing (not shown), the bearing being held in position by the usual castellate nut 129. The magnet 17 is provided with a hollow interior of a diameter somewhat greater than the size of the castellate nut so that the inner wall 130 of the magnet is able to engage the washer 126 which rests against the machined outer face of the axle housing 127. The main body 15 of the unit 10 is secured to an annular sleeve 132 which is secured to the magnet 17 in such a manner that it can be adjustably rotated with respect thereto. The sleeve 132 engages the outer face 133 of magnet 17. The faces 130 and 133 of magnet 17 are not parallel to each other but are slightly inclined with respect to each other. An arrangement of this type is shown in the Bender U.S. Pat. No. 3,171,208. The lefthand face of body portion 15 which engages face 133 is likewise slightly inclined from a plane at right angles to its longitudinal axis. Thus, when the collar 132 is rotated with respect to the magnet 17, the righthand end of the main body portion 15 is either tilted forwardly or rearwardly, or upwardly or downwardly, with respect to the magnet 17, as viewed in FIG. 3. Thus, when the unit is being used to measure toe-in so that mirrors 16 are facing forwardly as has been described in connection with FIGS. 1 and 2, rotation of the body portion 15 with respect to the magnet 17 changes the angular inclination of the body portion 15 with respect to the wheel axis. Suitable indicia are provided to indicate the extent of this inclination and the adjustment is normally made to correspond to the desired degree of toe-in.

The body portion 10 carries two inclination sensing devices. One of these consists of the mirror structure 16 referred to in connection with FIG. 1. As best shown in the sectional view of FIG. 4, this mirror structure comprises two mirrors 135 and 136 which are disposed at right angles with respect to each other. The mirrors 135 and 136 are located within a housing 137 recessed within the body portion 10. Such a mirror construction has the characteristic of being relatively insensitive to motion about an axis running along the juncture of the two mirrors. In other words, a light beam engaging the mirror is relatively unaffected by slight rotation of the casing 15 about its longitudinal axis. Any inclination of the housing 15 with respect to the axis of magnet 17 does result in a deflection of any light beam engaging the mirror surfaces.

The housing 15 also contains a level sensing device 140. This level sensing device takes the form of a tubular container 141 having three electrodes 142, 143 and 144 extending into the same. The tubular container 141 contains a volume of electrolyte 145 which is in conductive engagement with all three electrodes and acts as a resistive impedance. When the tube 141 is disposed in a completely level position, the volume of electrolyte 145 between the electrodes 142 and 143 is the same as that between electrodes 143 and 144. When, however, the tube 141 is tipped, the volume of electrolyte between one pair of electrodes increases and that between the other decreases. Thus, if the tube 141 is rocked in a counterclockwise direction, the volume of electrolyte between electrodes 142 and 143 increases and that between electrodes 143 and 144 decreases. Since the resistance between the electrodes is inversely proportional to the amount of electrolyte between them, it is obvious that the tipping of the tube 141 in either direction increases the resistance between the center electrode 143 and one of the end electrodes 142 and 144 and decreases the resistance between the center electrode 143 and the other of the electrodes. The opening in the housing 15 in which the level sensitive device is located is covered by a suitable cover plate 146. On the upper portion of housing 15 there is a socket 147 into which extend three terminals 149 which are electrically connected by suitable conductors to the three electrodes 142, 143 and 144. The socket 147 is designed to receive and retain a connector plug having terminal portions designed to coact with the terminals 149.

MEASUREMENT OF CAMBER AND CASTER

Figure 5:
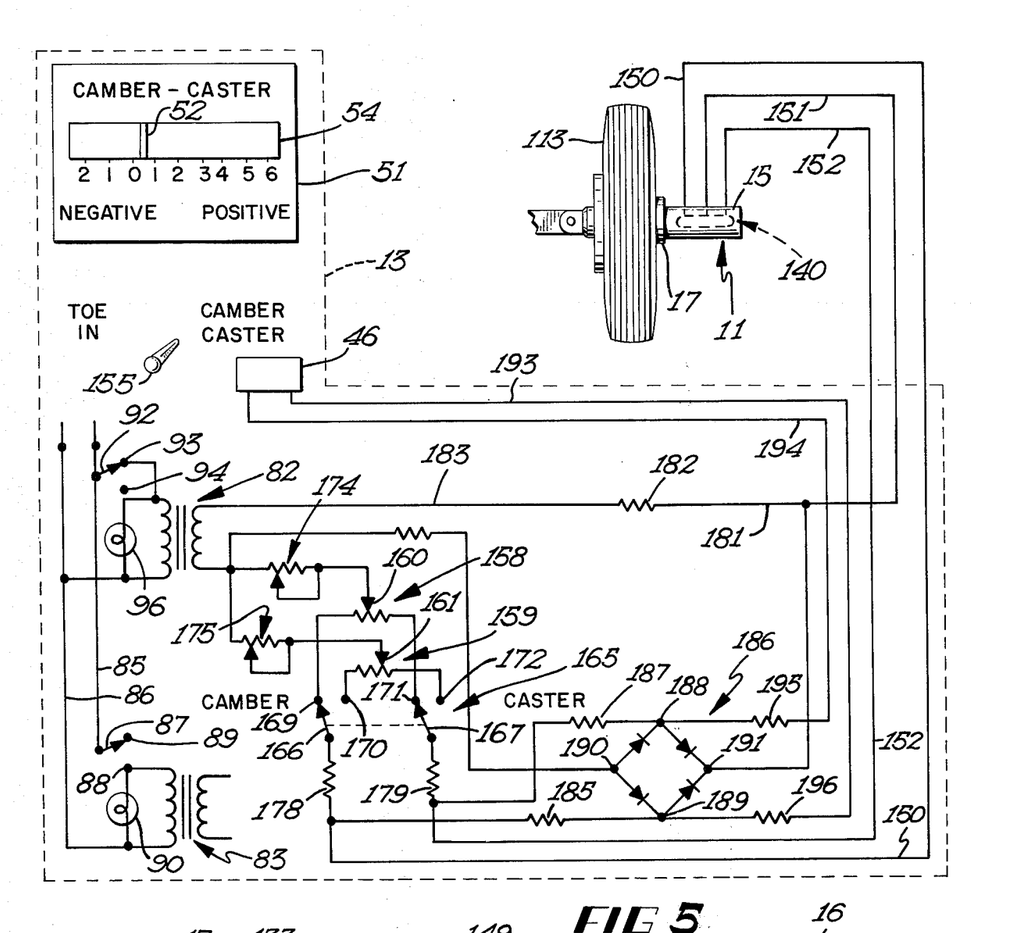
FIG. 5 is a schematic representation of our apparatus being employed for measuring camber and caster.

Referring now to FIG. 5, the general operation of the apparatus in connection with the measurement of camber and caster will be considered. The unit 11 is shown as attached to the same wheel 113 as in FIG. 2. The level sensing device 140 is shown in dotted lines since, as indicated in FIG. 3, this level sensing device is located on the underside of the main portion 15 of unit 11. Connected to the level sensing device are three conductors 150, 151 and 152. These three conductors are electrically connected to the three terminals 14, 143 and 114 of the level sensitive device. It is to be understood that these three conductors would constitute a three-conductor cable connected to a terminal plug which, in turn, is connected to the three terminal plugs 149 which are connected to the electrodes 142, 143 and 144. For purposes of simplicity, however, conductors 150, 151 and 152 are shown schematically as being connected directly to the level sensitive device 140.

Inasmuch as the unit 12 plays no part in the measurement of camber and caster, this has not been illustrated in FIG. 5. The electrical connections 150, 151 and 152 leading from the level sensing device 140 extend directly to the display unit 13, and, in a manner to be presently described, control the energization of the meter 46 which, in turn, controls the position of the light beam on the display panel 52. The servomechanism for positioning either of transparencies 61 or 62 is not illustrated in FIG. 5, this figure merely showing an actuator handle 155 for the selector switch 75 of FIG. 1. Thus, with the switch actuator 155 in the position shown in which it is pointing to the legend "Camber-Caster", the switch 75 is so positioned that switch blade 76 engages contact 78 to cause the servomotor 70 of FIG. 1 to run to a position in which the transparency for Camber-Caster is in the position to be projected. Thus, as indicated in FIG. 5, the display on panel 51 is a display for indicating camber and caster.

It will also be noted from FIG. 5 that the switch blades 87 and 92 are in their uppermost position in which switch blade 92 is in engagement with contact 93 to cause energization of the primary winding of transformer 82. This is desirable since the transformer 82 is the one which supplies power for measurement of camber and caster. At the same time, the signal light is energized to indicate that the camber and caster measuring apparatus is energized.

Very broadly, the secondary of transformer 82 is employed to energize a balanceable bridge including an adjustable potentiometer and a second potentiometer consisting of the level sensing switch 140, the unbalance of the bridge being applied through a ring modulator to control the energization of the meter 46. The bridge includes one or the other of two adjustable potentiometers 158 and 159 having adjustable contacts 160 and 161. A ganged switch 165 having two switch blades 166 and 167 is employed to control whether potentiometer 158 or potentiometer 159 is connected into the circuit. Switch blade 166 is movable between engagement with a "camber" contact 169 and a "caster" contact 170. Similarly, the switch blade 167 is movable between a camber contact 171 and a caster contact 172. When the switch blades 166 and 167 are in engagement with the camber contacts 169 and 171, the potentiometer 158 is connected into the bridge and when the switch blades 166 and 167 are in engagement with the caster contacts 170 and 172, the potentiometer 159 is connected into the bridge. The slider 160 of potentiometer 158 is connected through a rheostat 174 to the lower terminal of the secondary of transformer 82. Similarly, the slider 161 of potentiometer 159 is connected through a rheostat 175 to the same lower terminal. The switch blades 166 and 167 are connected through resistors 178 and 179 to conductors 150 and 152 leading to the opposite terminals of the level sensitive electrolytic switch 140. The conductor 151 connected to the center electrode 143 of the electrolytic switch is connected through conductor 181, a resistor 182 and conductor 183 to the upper terminal of the secondary of transformer 82. The junction of resistor 178 with conductor 150 is connected through a resistor 185 with one input terminal 189 of a ring modulator 186. The lower end of resistor 178 is similarly connected through a resistor 187 to the opposite input terminal 188 of the ring modulator. This ring modulator 186 comprises four diodes connected so as to provide the input terminals 188 and 189 and a second set of input terminals 190 and 191. The opposite terminals of the secondary of transformer 82 are connected to the two input terminals 190 and 191. The meter 46 is connected through conductors 193 and 194 and resistors 195 and 196 to input terminals 188 and 189.

Assuming the potentiometer 158 to be connected into the bridge circuit by reason of the switch blades 166 and 167 being in the position shown, it will be noted that there is a bridge in which the input terminals are the sliders 160 and the center electrode 143 of level responsive switch 140, these two input terminals being connected to the opposite terminals of the secondary of transformer 82, as previously described. The output terminals of this bridge are the terminals at the lower ends of resistors 178 and 179 which, as previously described, are connected to the input terminals 189 and 188. At the same time, the A.C. input from the output of secondary 82 is applied to the two input terminals 190 and 191 of the ring modulator bridge 186. The current during the half cycle in which the left-hand terminal 90 tends to be positive with respect to the right-hand terminal 191 can take place equally through both branches of the ring modulator if no input voltage is present across the input terminals 188 and 189. Since the four diodes are all of equal value, it will be obvious that the two terminals 188 and 189 will be at the same potential if no unbalance voltage is applied by the bridge to the two terminals 188 and 189. If, however, the bridge is unbalanced so that an A.C. voltage is applied between terminals 188 and 189, this will cause a resultant pulsating D.C. output voltage to appear between terminals 188 and 189 which has a polarity depending upon the direction of unbalance of the bridge. This unbalance voltage will be applied to the meter 46 and will be of a polarity depending upon the unbalance of the bridge which, in turn, is dependent upon the direction in which the level sensing resistor 140 is tipped.

When it is desired to measure camber, the switch 165 is placed in the position shown in FIG. 5, so that switch blades 166 and 167 are in engagement with the camber contacts 169 and 171, respectively. This places the potentiometer 158 in the bridge circuit. The rheostat 174 varies the voltage supplied to the bridge and hence varies the amount of deflection of meter 46 for a given change in the impedance on opposite sides of switch 140. This rheostat hence operates as a sensitivity adjustment or as a means for calibrating the unit so that the deflection of the light beam 42 on the scale thrown on the screen 51 by the projection of transparency 62 corresponds to the actual deviation of the camber from the desired point.

The slider 160 of potentiometer 158 acts as a zero point adjustment to insure that when the camber is at the desired value, the light beam 52 is opposite the 0 point on the scale. The unit 11, by reason of the inclined adjacent surfaces of the body portion 15 and the magnet portion 17, can be adjusted to tilt the body portion 15 up and down to correspond do the desired amount of camber. Suitable calibrations are provided between the body portion 15 and the magnet portion 17 to indicate various degrees of camber. In initial adjustment of the device, the unit 11 is applied to a wheel having a known degree of camber and the body portion 11 is adjusted with respect to magnet portion 17 to compensate for this camber. If the light beam 52 is not at the 0 point, the slider 160 is adjusted until the light beam 52 is at the o-position. After this initial adjustment is once made, the equipment is suitable for use in vehicles with varying degrees of camber and no further adjustments of this type need be made.

If the unit 11 is applied to a wheel in which the camber differs from the desired camber for the particular vehicle, the bridge including level sensitive device 150 and potentiometer 158 will be unbalanced, as previously described. This will, in turn, cause a voltage of one polarity or the other to be applied to the meter 46 which will operate as shown in FIG. 1 to deflect the light beam to one side or the other or the 0 point, depending upon the direction of deviation of the camber from the desired value. The mechanic will then adjust the camber until the light beam is at the 0 point.

Since the camber, unlike toe-in, may be different for each of the two front wheels, the mechanic, after adjusting the camber of one wheel, will remove the unit 11 and place it on the opposite front wheel. The process described above is then repeated and the camber adjusted until it is correct.

MEASUREMENT OF CASTER

When it is desired to measure caster, the change-over switch 165 is moved from the position shown in FIG. 5 to the Caster position in which switch blades 166 and 167 are in engagement with caster contacts 170 and 172. The effect of the movement of this switch is to disconnect the potentiometer 158 from the bridge circuit and substitute therefor the potentiometer 159.

Since the caster measurement is made after a camber adjustment has been made, the light beam 52 should be at the 0 point. If it is not, the slider 161 of potentiometer 159 can be adjusted to bring the reading to 0. This adjustment should be made with the wheel pointing straight ahead. The wheel is now swung back and forth through an angle of 20° on each side of this position. At each end of the swinging movement of the wheel, the reading of the light beam 52 is noted. If the caster is correct, the amount of deviation of the light beam 52 should be the same when the wheel is swung 20° to the right, for example, as when it is swung 20° to the left. If the change in position of the light beam is not the same for equal movements of the wheel in opposite directions, then the caster is incorrect. The mechanic then makes suitable adjustments until the deflection of the light beam is the same regardless of whether the wheel is moved 20° to the right or 20° to the left.

It will, of course, be appreciated that the operation of the bridge is the same for the caster measurement as for the camber measurement, the only difference being that for calibration purposes, the potentiometer 159 is employed instead of the potentiometer 158.

OVER-ALL ELECTRICAL CIRCUIT

Figure 6:
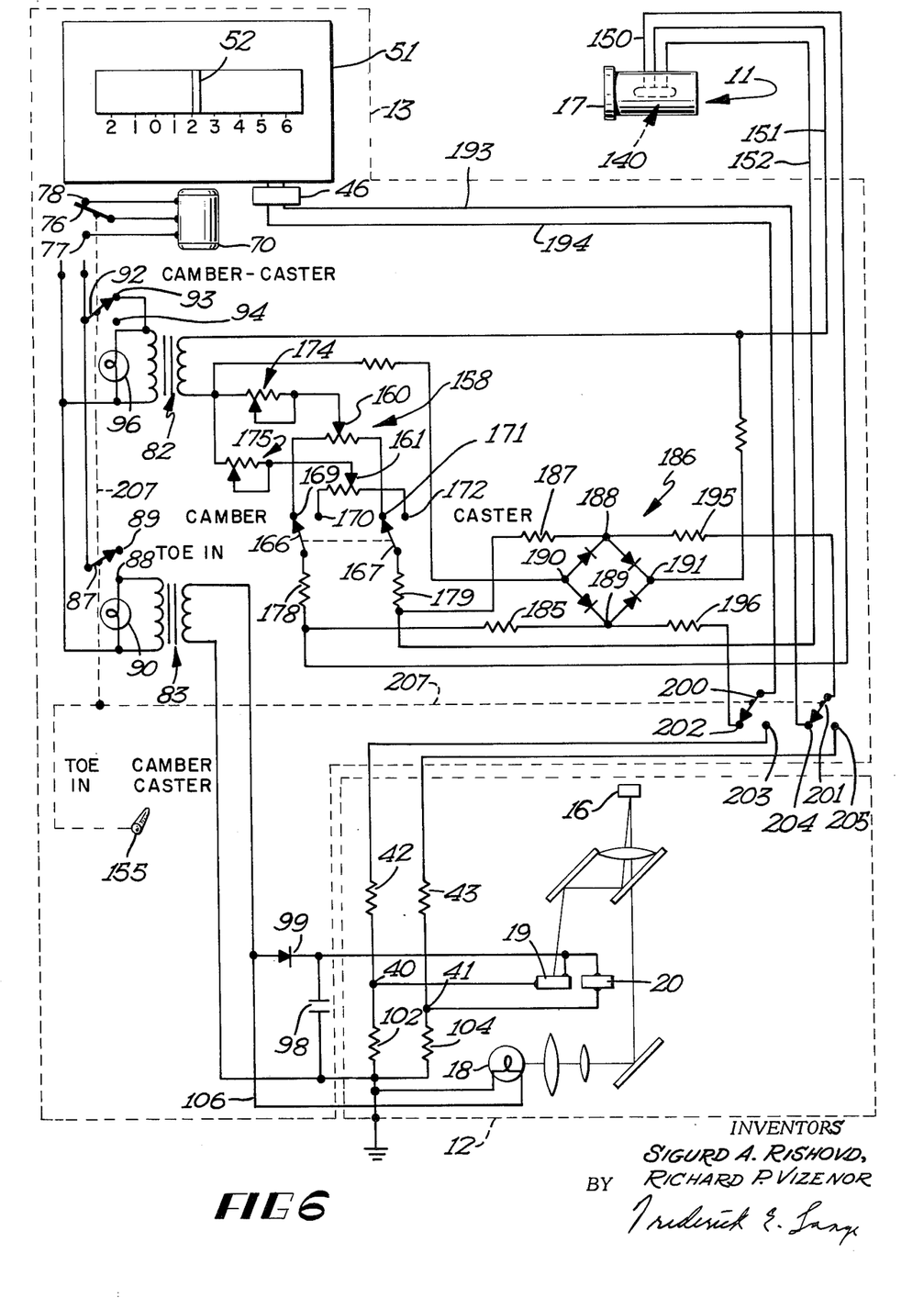
FIG. 6 is a schematic showing of our complete apparatus with portions thereof being shown in block form.

In the foregoing explanation, the electrical portion of the system employed for measurement of toe-in has been shown separately from the electrical portion of the system for measuring camber and caster. This was done in order to simplify the description of the apparatus as much as possible. In FIG. 6, we have shown the entire electrical circuit in one drawing. In general, it is not believed necessary to specifically describe the various components again but merely to refer to certain features peculiar to the change-over from camber-caster to toe-in. In describing FIGS. 1 and 5, the means interlocking the switches 87 and 92 were not shown. Furthermore, in FIGS. 1 and 5, the apparatus was shown as though meter 46 was directly connected at all times to terminals 40 and 41 leading from the light sensitive cells 19 and 20 and to the terminals 188 and 189 of the ring modulator 186. In actual practice, when the change-over switching mechanism is set in the toe-in position, the meter 46 is connected only to the network including light sensitive cells 19 and 20 and when the change-over switching arrangement is in the position for camber-caster measurement, the meter 46 is connected only to the output terminals of the ring modulator 186. The additional switches to affect this change-over have been shown in FIG. 6.

In comparing FIG. 6 with FIGS. 1 and 5, the same reference numerals have been used for the corresponding elements and, as indicated above, these elements will not be again described. The switch blades of the additional switches referred to above have been designated by the reference numerals 200 and 201. Switch blade 200 is movable between engagement with the contact 202 and a further contact 203. Similarly, switch blade 201 can be engaged either with a contact 204 or a contact 205. The switch blades 200 and 201 are mechanically connected together so that the switch blades are moved in unison and are either in engagement with contacts 202 and 204 or in engagement with contacts 203 and 205. The switch blades 200 and 201 are mechanically connected to the switch blades 87 and 92, described in connection with FIGS. 1 and 5, and which control which of the two transformers 82 or 83 is energized. This mechanical connection of switch blades 200 and 201 with switch blades 87 and 92 is accomplished by any suitable arrangement commonly employed in ganged switches which is schematically shown in the drawing by a dotted line designated 207. The same mechanical connection extends from switch blades 87 and 92 to the switch blade 76 which controls the motor 70 driving the transparency positioner referred to in connection with FIG. 1. The mechanical connection between these switch blades also extends to the switch actuator 155. Thus, the switch actuator 155 is mechanically connected to switch blades 76, 92, 87, 200 and 201.

With the elements in the position in FIG. 6, the switch actuator 155 is in its "camber-caster" position in which the switch blade 76 controlling the servomotor 70 is in engagement with its camber-caster contact 78 so as to cause the servomotor 70 to drive the transparency projector to a position in which the camber-caster display appears upon screen 51. At the same time, the switch blade 87 and 92 are in the position in which swtich blade 92 is in engagement with contact 93 to cause energization of the primary winding of transformer 82 which, it will be recalled, is connected to the camber-caster network to energize the same.

In addition, switch blades 200 and 201 are in engagement with contacts 202 and 204. Contacts 202 and 204 are connected respectively with resistors 196 and 195 which, as will be recalled, are connected to the output terminals 189 and 188 of the ring modulator 186. The switch blades 200 and 201 are, in turn, connected to the two input terminals of the meter 46. Thus, with switch blades 200 and 201 in the position shown, the output of the ring modulator 186 is connected to the meter 46. It will be recalled that the ring modulator is controlled in accordance with either camber or caster depending upon the position of the switch 165 in FIG. 5.

It will thus be seen that with the switch actuator 155 in the position shown, the servomotor 70 is driven to a position to cause the camber-caster transparency to be projected onto screen 51, power is being supplied to the transformer 82 to energize the camber-caster network and the input terminals of meter 46 are connected to the output terminals of the camber-caster network so that the meter is controlled in accordance with the camber or caster.

If the switch actuator 155 is now turned to its Toe-In position, the switch blades 76, 87, 92, 200 and 201 are moved to their other switching positions. In the case of switch 76, this causes it to be moved into engagement with the contact 77 to cause the servomator to rotate the transparency holder to bring the toe-in transparency into a position where it is projected on screen 51, as shown in FIG. 1. The movement of switch blade 92 out of engagement with contact 93 causes de-energization of transformer 82 to cause de-energization of the camber-caster network. The movement of switch blade 87 from engagement with the "dead" contact 89 to engagement with the contact 88 causes energization of the transformer 83 which supplies power to the network including the light sensitive cells 19 and 20 employed in measuring toe-in. At the same time, the light 90 is energized to indicate that toe-in is now being measured. The movement of switch blades 200 and 201 from engagement with contacts 202 and 204 causes the output of the camber-caster network to be disconnected from the meter 46. At the same time, the movement of switch blades 200 and 201 into engagement with contacts 203 and 205 results in the meter being connected to the output of the network including the light sensitive cells 19 and 20. It will be noted that contact 203 is connected to the upper terminal of resistor 42 and contact 205 is connected to the upper terminal of resistor 43. Thus, as previously described in connection with FIG. 1, any difference in the illumination of the light sensitive cells 19 and 20, due to the toe-in not being at the desired value, results in a voltage being impressed across terminals 40 and 41 which, in turn, are connected to resistors 42 and 43. Thus, with switches 200 and 201 in engagement with contacts 203 and 205, this unbalance voltage due to unequal illumination of the cells 19 and 20 when the correct toe-in is not present, is impressed upon meter 46 to cause the light beam 52 to assume a position dependent upon the deviation of the toe-in from the desired value.

In connection with the operation of the toe-in sensing mechanism in FIG. 6, the mirror 46 has been shown as detached from the wheel mounted unit 11. It is to be understood that this is purely schematic to better illustrate the electrical connections. The mirror 16 is, of course, mounted on the wheel unit 11 as shown in detail in FIGS. 3 and 4.

MODIFICATION OF FIGURE 7

Figure 7:
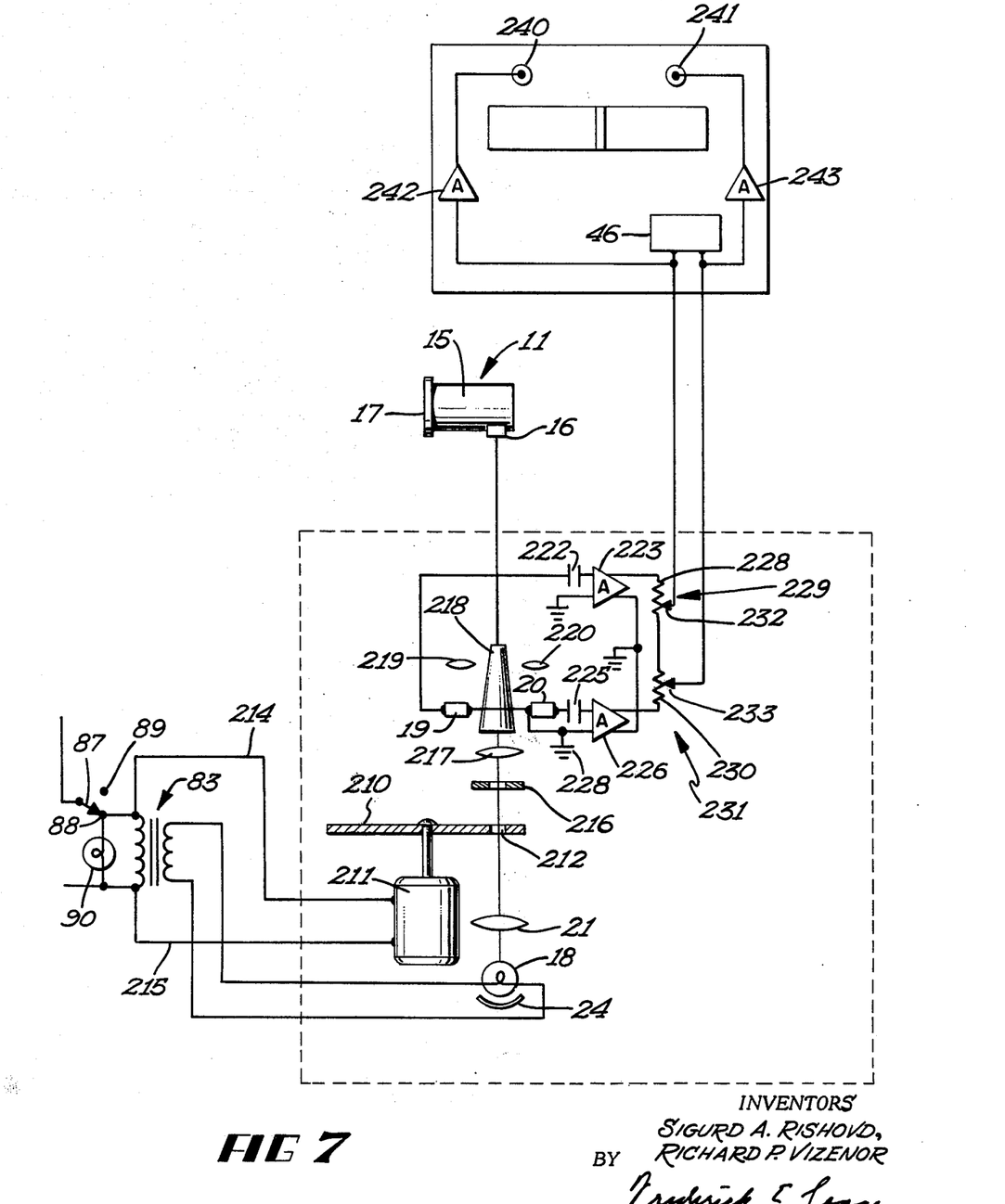
FIG. 7 is a schematic view of a modification of the toe-in portion of our apparatus in which special means are provided for guarding against the effect of changes in ambient light.

In FIG. 7, we have shown the toe-in portion of a modified form of our wheel alignment apparatus. It is to be understood that the camber-caster portion of the apparatus is the same as shown in FIGS. 5 and 6.

The modification of FIG. 7 is particularly designed for use where the ambient light intensity is sufficiently high as to affect the operation of the light sensitive cells 19 and 20. Very broadly, we employ a light chopper interposed between the source of light and the mirror 16 of the wheel mounted unit 11 so that the light reflected back by mirror 16 onto the light sensitive cells 19 and 20 is of a pulsating nature. The unbalance voltage resulting from the current flowing through these cells is then amplified through an arrangement which passes only alternating current. The result is that any steady state change in the illumination of either light sensitive cell 19 or light sensitive cell 20 has no appreciable effect upon the output voltage fed to the meter 46.

Referring to the various elements of the system of modification of FIG. 7, the reference numeral 210 is employed to indicate a chopper disc which is driven by a motor 211. The chopper disc 210 has an aperture 212 therein which, when in the position shown, is positioned coaxially with a line extending between the light source 18 and the reflecting mirror 16. The disc 210 is formed of suitable opaque material which normally blocks the light passing between the light source 18 and the mirror 16. Depending upon the desired frequency of the pulsating light beam and depending upon the speed of revolution of motor 211, it may be desirable to employ several apertures 212. On the other hand, only one such aperture need be employed. A motor 211 is connected by conductors 214 and 215 to the primary side of transformer 83 so that when switch 87 is in engagement with contact 88 to energize the transformer 83 for toe-in measurement, the motor 211 is directly connected to the A.C. source of power energizing the primary winding of transformer 83 and runs continuously.

The light beam from lamp 18 passes through the condensing lens 21 and, when the disc 210 is in the position where the aperture 212 is in alignment with the beam, through the aperture 212 and through an aperture in an apertured disc 216. The light then passes through another condensing lens 217 and from that through a conical light-confining shield 218 to the mirror 16. The light reflected back from the mirror 16, if the toe-in is not at the desired value, passes through one or the other of two lenses 219 and 220 onto either light sensitive cell 19 or light sensitive cell 20. One terminal of light sensitive cell 19 is connected through a blocking capacitor 222 to the ungrounded input terminal of an A.C. amplifier 223. The corresponding terminal of light sensitive cell 20 is connected through a blocking capacitor 225 to the ungrounded input terminal of a second A.C. amplifier 226. The junction of the two light sensitive cells 19 and 20 is connected to ground at 228 and hence to the ground at input terminals of A.C. amplifiers 223 and 226. As a result of these connections, any pulsations in the conductivity of light sensitive cell 19 affects the input voltage applied to amplifier 223 while any pulsations in the current flowing through light sensitive cell 20 affects the input voltage of amplifier 226. It will, of course, be understood that amplifiers 223 and 226 are energized from a suitable source of power derived from the A.C. source of power. Such energizing means are conventional and are not shown in order to amplify the showing. Due to the presence of the blocking capacitors 222 and 225, any steady state change in the conductivity of either light sensitive cell 19 or light sensitive cell 20 has not effect upon the input voltages of the amplifiers 223 and 226. The output voltage of A.C. amplifier 223 is impressed across the resistance 228 of a potentiometer 229. Similarly, the output voltage of amplifier 226 is impressed across the resistance 230 of a potentiometer 231. Resistances 228 and 230 are connected in series opposition. Potentiometer 229 is provided with a slider 232 and potentiometer 231 with a slider 233. When the voltages across the output terminals of amplifiers 223 and 226 are equal and the sliders 232 and 233 properly adjusted on the resistors 228 and 230, no voltage appears between the sliders 232 and 233. If, however, the output of one of the amplifiers 223 increases with respect to the output of the other amplifier, a voltage will appear between sliders 232 and 233 which is of a polarity corresponding to which of the two amplifiers has the greater output. The amplifiers 223 and 226 are so designed that while the input voltage is an A.C. voltage, the output voltage is unidirectional. Such amplifiers are old and well known and need not be described in detail. The net effect is that a voltage is applied to the meter 46 which is unidirectional and of a polarity depending upon the relative illumination of photocells 19 and 20.

Since the amplifiers 223 and 226 are not affected by any steady state change in the illumination of either light sensitive cell 19 or light sensitive cell 20, it is obvious that the voltage appearing at the output terminals of the amplifiers and hence across the resistors 228 and 230 is unaffected by any change in ambient light.

A further feature shown in connection with FIG. 7 is that of providing a plurality of lights 240 and 241, one or the other of which is illuminated when the toe-in deviates from the desired value by a predetermined amount. The voltage appearing between slider 232 and the junction of resistors 228 and 230 which is grounded, is applied to the input of an amplifier 242, the output of which is applied to lamp 240. Similarly, a voltage appearing between slider 233 and the grounded junction of resistors 228 and 230 is applied to the input of an amplifier 243, the output of which controls the illumination of lamp 241. Whenever the output of amplifier 223 is above a predetermined value, the output of amplifier 242 is sufficiently high to illuminate the photocell 240. Similarly, whenever the output of amplifier 226 is sufficiently high, the lamp 241 will be illuminated. Thus, one or the other of the two lights 240 or 241 will be illuminated if the toe-in departs from the desired value by a predetermined amount.

CONCLUSION

It will be seen that we have provided a wheel alignment apparatus capable of measuring either toe-in, camber or caster in which the alignment condition being measured is used to produce an electrical signal which, in turn, is used to control an electrical display device which is effective, regardless of ambient lighting conditions, to clearly indicate the deviation of the wheel alignment characteristic being measured from the desired value.

While we have shown certain specific embodiments for purposes of illustration, it is to be understood that the scope of the invention is limited solely by the appended claims.

We claim:

1. Apparatus for determining the alignment of a vehicle wheel comprising:

a portable device having means for detachably securing the same to a vehicle wheel;

a second device for placement in front of the vehicle being tested;

one of said devices having angularly adjustable means for reflecting a beam of light directed towards it and the other of said devices having a source of light and a pair of light sensing devices, means for projecting the light therefrom as a beam of light extending generally parallel to the axes of the automotive vehicle being checked and towards the reflecting means in the other of said devices so that the light beam is reflected back onto said light sensing devices, the relative extent to which said beam of light engages the two light sensing devices being dependent upon the relative inclination between the axis of rotation of the wheel and the longitudinal axis of the automotive vehicle, said reflecting means, said source of light and said light sensing means forming the sensing portion of a light responsive toe-in measuring system;

a network connected to said light sensitive cells and having an electrical output dependent upon the angle between the axis of rotation of the wheel being tested and the longitudinal axis of the automotive vehicle and hence of the toe-in of the wheel;

meter means and scale means associate therewith and calibrated in degrees of toe-in;

and means for operatively connecting said network to said meter means for indicating the amount of toe-in of the wheel being tested.

2. The apparatus of claim 1 in which the device adapted to be secured to a wheel is secured by adjustable means designed to be adjusted to compensate for the normal inclination present when the toe-in characteristic being measured has the desired value.

3. The apparatus of claim 1 in which the portable device has two portions adjustably and rotatably secured to each other, the inner of said portions being disposed adjacent the vehicle wheel and having the means for securing the device to a vehicle wheel and the outer of said portions carrying the element forming part of the light responsive toe-in measuring system, said two portions having abutting surfaces disposed nonperpendicularly with respect to the axis of rotative adjustment so that when said portions are rotated with respect to each other, the angle of the longitudinal axis of said outer portion with respect to the rotational axis of the wheel is varied so as to enable compensation for normal toe-in 4. The apparatus of claim 3 in which the element of the light responsive toe-in measuring system carried by the outer portion of the portable device is the light reflecting means, the reflective angle of which is angularly adjusted as the outer portion of the portable device is rotatably adjusted with respect to the inner portion.

5. The apparatus of claim 4 in which the light reflecting means comprises two mirrors disposed at an angle with respect to each other with the juncture line of the mirrors extending substantially parallel to the axis of said outer portion of said portable device so as to be relatively unaffected by small rotational movements of said portable device unaccompanied by any change in inclination of the axis of said outer portion.

6. The apparatus of claim 1 in which said portable device further comprises a level sensitive device having a plurality of electrodes the impedance between which varies with the angle at which said device is tilted, said level sensitive device being mounted on said portable device generally parallel to the axis of rotation of the wheel so as to be affected by changes in camber of the wheel; in which there is a further network connected to said level sensitive device and having an electrical output dependent upon the camber of the wheel being tested; and in which there is means for connecting said further network to said meter means for indicating such camber.

7. The apparatus of claim 6 in which there is a single meter selectively connected to the outputs of the toe-in and camber networks; in which there is means for projecting onto a screen the position of the movable indicating member of the meter; and in which there is means for selectively projecting onto said screen toe-in scale indicia or camber scale indicia depending upon whether the meter is connected to the toe-in or camber networks.

8. The apparatus of claim 6 in which there is illuminated means for indicating whether said meter means is being actuated in accordance with the toe-in condition or the camber condition.

9. The apparatus of claim 6 in which means is provided for periodically interrupting the source of light and in which the means connecting the light sensing devices to said meter means is effective to prevent said meter means from being affected by a steady state change in illumination of said light sensing devices.

10. The apparatus of claim 1 in which means is provided for periodically interrupting the source of light and in which the means connecting the light sensing devices to said meter means is effective to prevent said meter means from being affected by a steady state change in illumination of said light sensing devices.

11. Apparatus for determining the alignment of a vehicle wheel comprising:
    sensing means effective to indicate the inclination of the wheel with respect to a predetermined reference and having an electrical output dependent upon the extent of said inclination;
    said sensing means including a device adapted to be detachably secured to the wheel;
    an electrical display means including a meter movement and a movable indicating member positioned by said meter movement in accordance with the extent of energization of said display means;
    means connecting said sensing means to said electrical display means in such a manner that the position of said movable indicating member is dependent upon the extent of such inclination; and
    means for projecting onto a screen the position of said movable indicating member, said screen having associated therewith a chart having indicia thereon to interpret the position of said movable member with respect to the characteristic of alignment being considered.

12. Apparatus for determining the alignment of a vehicle wheel comprising:
    a. a first means adapted to be disposed upon a wheel of a vehicle;
    b. a second means adapted to be disposed adjacent said wheel of a vehicle;
    c. one of said means including means for angularly, adjustably disposing said one of said means, one of said means including a source of light radiant energy and a pair of radiant energy sensing means and the other of said means including means for reflecting radiant energy, whereby a beam of radiant energy from one of said means if reflected from the other of said means in equal amount to each of the pair of radiant energy sensing means when the axis of rotation of a wheel is in a predetermined relationship to an axis normal to the effective plane of reflection of the means for reflecting radiant energy on said other of said means; and d. meter means connected to the pair of radiant energy sensing means and calibrated to indicate units of relative displacement of the axis of rotation of said vehicle wheel from a predetermined attitude.

13. The apparatus of claim 12 in which the first means includes the means for angularly adjustably disposing said first means on the wheel of a vehicle.

14. The apparatus of claim 13 in which the first means includes the source of radiant energy and the pair of sensing means.

15. The apparatus of claim 13 in which means is provided for periodically interrupting the source of radiant light energy and in which the radiant energy sensing means are effective to prevent the indicating means from being affected by a steady state change in illumination of said radiant energy sensing means.

16. The apparatus of claim 13 in which the means for angularly adjustably disposing the first means on a wheel includes a further reference means from which the relative angular disposition of the first means is determined.

17. The apparatus of claim 14 in which means is provided for periodically interrupting the source of radiant light energy and in which the radiant energy sensing means are effective to prevent the indicating means from being affected by a steady state change in illumination of said radiant energy sensing means.

18. The apparatus os claim 14 in which the means for angularly adjustably disposing the first means on a wheel includes a further reference means from which the relative angular disposition of the first means is determined.

19. The apparatus of claim 12 in which the first means includes the source of radiant energy and the pair of sensing means.

20. The apparatus of claim 12 in which means is provided for periodically interrupting the source of radiant light energy and in which the radiant energy sensing means are effective to prevent the indicating means from being affected by a steady state change in illumination of said radiant energy sensing means.

21. The method of comparing the attitude of the axis of rotation of a wheel of a vehicle with a reference axis extending normal to a reference plane comprising:
    a. establishing a radiant energy reflecting plane;
    b. disposing said reflecting plane in predetermined attitude with respect to a wheel of a vehicle, the attitude of which is to be determined;
    c. disposing a pair of radiant energy sensing means in predetermined relationship to said wheel of a vehicle;
    d. providing a source of radiant energy;
    e. projecting a beam of said radiant energy from a location adjacent said sensing means toward said reflecting plane and in predetermined directional relationship relative to the axis of rotation of said wheel; and
    f. sensing the relative amount of radiant energy reflected back onto each of the pair of sensing means and the source of radiant energy to determine the relative attitude of the axis of rotation of a wheel and said reference plane, and
    g. indicating the relative output of the sensing means on a meter calibrated in units of relative attitude.

22. The method of claim 21 in which the pair of sensing means are disposed in a horizontal plane.

23. The method of claim 21 in which the sensing means are disposed in a vertical plane.

24. The method of claim 21 in which the source of radiant energy is periodically interrupted.

* * * * *